Jan. 12, 1932. J. M. ZABACK 1,841,236
CHAIN DEVICE
Filed June 27, 1930
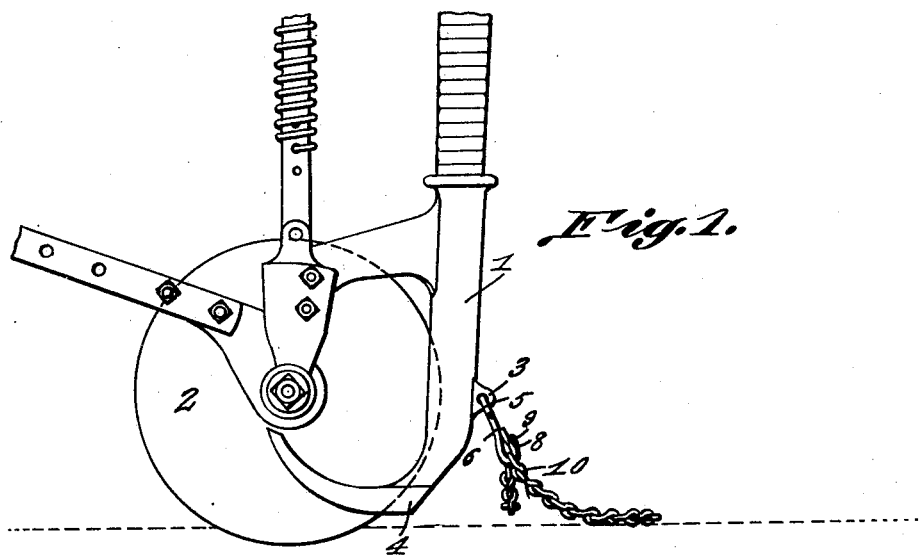
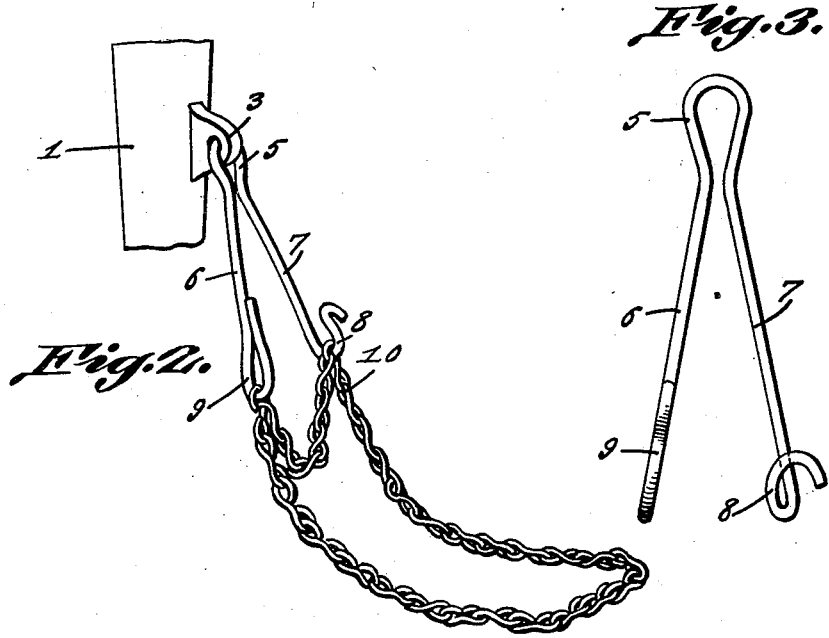

Patented Jan. 12, 1932

1,841,236

UNITED STATES PATENT OFFICE

JOHN M. ZABACK, OF BERGEN, NORTH DAKOTA

CHAIN DEVICE

Application filed June 27, 1930. Serial No. 464,332.

My present invention has reference to seed covering chains for grain drills, and the primary object of the invention is the provision of a means for this purpose whereby the chain can be supported in a spread condition at the rear of the drill so that the same will effectively cover the seed directly after it passes into the furrow and will likewise be positively directed into the furrow.

A still further object is the provision of a device for this purpose which may be easily and quickly attached to the eye of the seed spout of any ordinary drill, which may be widened to regulate the distance between the side elements of the chain, which may be vertically adjusted and likewise shortened so that the same can be arranged near the spout or runner in gummy soil to prevent the clogging of the chain as it travels over such soil and further wherein the chain leaves the field behind the drill in a better condition than those of an ordinary construction.

A still further and important object is the provision of a hanger for chains that can be readily attached to the eye and the seed spout of any ordinary grain drill, and which includes a wire member having a central eye and angle arms which merge into hooks to which the chains are adjustably and if necessary removably connected.

To the attainment of the foregoing the invention consists in the improvement hereinafter described and definitely claimed.

In the drawings:

Figure 1 is a side elevation of a sufficient portion of a disc grain drill provided with the improvement.

Figure 2 is a perspective view of the improvement and a portion of the seed spout in section.

Figure 3 is a plan view of the improvement.

In Figures 1 and 2 of the drawings the seed spout of a disc drill is indicated by the numeral 1. The seed spout is mounted at the rear of the disc 2 in the usual manner and is provided with the usual outstanding apertured lug or eye 3 arranged a suitable distance above the runner 4.

In carrying out my invention I pass through the eye 3 of the spout 1 a central eye or looped end 5 of the hanger of the improvement. The hanger is constructed of wire and from its looped end is provided with arms which are arranged at outward angles and which for distinction are indicated by the numerals 6 and 7, respectively. The upper end of the arm 7 is given a rounded twist, as indicated by the numeral 8, and the outer end of the arm 6 is rounded and bent upon itself to provide the same with a hook 9. The coil portion 8 receives therethrough one of the links 10 of a drag chain and, of course, the eye 9 receives therein a second link of the said chain.

With the improvement it is obvious that the drag chain may be variously adjusted with respect to its support and while the support is constructed of strong wire the arms 6 and 7 thereof may be spaced away from each other which, of course, spaces the sides of the continuous chain 10. The improvement will positively direct seed into the furrow made by the disc 2 and will leave the ground level to the rear of the spouts. By properly adjusting the chain the same cannot clog regardless of the earth over which it is dragged and it is thought the foregoing description will fully and clearly set forth the simplicity and advantages of my device to those skilled in the art to which such invention relates so that further detailed description will not be required. Obviously I do not wish to be restricted to the specific details herein shown and described and, therefore, hold myself entitled to make such changes therefrom as fairly fall within the scope of what I claim.

Having described the invention, I claim:

1. In combination with a seed spout of a disc seeding machine having an eye on the rear thereof, of a wire member having a central loop that is freely passed through the eye, said member having angularly disposed arms which merge into hooks and a chain having certain of its links engaged by the hooks.

2. In a device for the purpose set forth, a wire member having a central looped portion designed to be passed through the eye on the rear of the spout of a disc grain planter, said member having its arms arranged at opposite angles from its loop, but its said arms being bendable toward or away from each other, hooks on the outer ends of the arms and an endless chain designed to have certain of its links engaged by the hooks.

3. In a device for the purpose set forth, a wire member having a central looped portion designed to be passed through the eye on the rear of the spout of a disc grain planter, said member having its arms arranged at opposite angles from its loop, one arm having its outer end looped and its second end bent to provide a hook, and an endless chain designed to have certain of its links received in both the loop and hook.

In testimony whereof I affix my signature.

JOHN M. ZABACK.